United States Patent
Miyazawa et al.

(10) Patent No.: US 11,055,696 B2
(45) Date of Patent: Jul. 6, 2021

(54) PORTABLE TERMINAL, TERMINAL FUNCTION MANAGEMENT SYSTEM, TERMINAL FUNCTION MANAGEMENT METHOD, TERMINAL FUNCTION MANAGEMENT PROGRAM, AND COMPUTER-READABLE RECORDING MEDIUM UPON WHICH SAID PROGRAM HAS BEEN RECORDED

(71) Applicant: Rakuten, Inc., Tokyo (JP)

(72) Inventors: Kazumasa Miyazawa, Shinagawa-ku (JP); Hideki Akashika, Shinagawa-ku (JP); Yoshito Naganuma, Shinagawa-ku (JP); Yutaka Jinno, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 726 days.

(21) Appl. No.: 14/368,648

(22) PCT Filed: Dec. 26, 2012

(86) PCT No.: PCT/JP2012/083677
§ 371 (c)(1),
(2) Date: Jun. 25, 2014

(87) PCT Pub. No.: WO2013/099958
PCT Pub. Date: Jul. 4, 2013

(65) Prior Publication Data
US 2015/0142652 A1    May 21, 2015

(30) Foreign Application Priority Data

Dec. 28, 2011 (JP) .............................. JP2011-289810

(51) Int. Cl.
*G06Q 20/34* (2012.01)
*G06F 21/62* (2013.01)
(Continued)

(52) U.S. Cl.
CPC ....... *G06Q 20/341* (2013.01); *G06F 21/6245* (2013.01); *G06Q 20/3226* (2013.01);
(Continued)

(58) Field of Classification Search
None
See application file for complete search history.

(56) References Cited

U.S. PATENT DOCUMENTS 5,640,002 A * 6/1997 Ruppert ............... G06K 7/0008
235/462.46
7,849,161 B2 * 12/2010 Koch ..................... H04L 67/34
709/219

(Continued)

FOREIGN PATENT DOCUMENTS

JP    2002-197423 A    7/2002

OTHER PUBLICATIONS

Data Encryption and Tokenization: An Innovative One-Two Punch to Increase Data Security and Reduce the Challenges of PCI DSS Compliance. First Data. Sep. 2009. Web. Mar. 10, 2021. <https://www.firstdata.com/downloads/thought-leadership/fd_encrypt_token_pci_whitepaper.pdf>. (Year: 2009).*

(Continued)

*Primary Examiner* — Kito R Robinson
*Assistant Examiner* — Shacole C Tibljas
(74) *Attorney, Agent, or Firm* — Sughrue Mion, PLLC

(57) ABSTRACT

A portable terminal, a terminal function management system, and a terminal function management method that can prevent electronic money fraud by another person after loss or theft and readily and accurately determine the electronic money balance to be guaranteed are provided. In a portable terminal, a lock function that imposes restrictions on access to a chip storage unit that stores a value balance is enabled. It is thereby possible to prevent electronic money fraud by (Continued)

another person after the loss or theft of the portable terminal. Further, in the portable terminal, a value balance acquired after the lock function is enabled and before the lock function is released is stored in an electronic money server. It is thereby possible to readily and accurately determine the electronic money balance to be guaranteed which is stored the chip storage unit at the time when the loss or theft is found.

12 Claims, 10 Drawing Sheets

(51) Int. Cl.
  *G07F 7/10* (2006.01)
  *G06Q 20/32* (2012.01)
  *G06Q 20/36* (2012.01)
  *G06Q 20/40* (2012.01)

(52) U.S. Cl.
  CPC ......... *G06Q 20/353* (2013.01); *G06Q 20/354* (2013.01); *G06Q 20/3672* (2013.01); *G06Q 20/3676* (2013.01); *G06Q 20/4012* (2013.01); *G07F 7/1008* (2013.01)

(56) References Cited

U.S. PATENT DOCUMENTS

| | | | |
|---|---|---|---|
| 8,751,294 B2* | 6/2014 | Bhattacharya | G06Q 20/02 705/14.1 |
| 8,868,458 B1* | 10/2014 | Starbuck | G06Q 40/00 705/35 |
| 2005/0246292 A1* | 11/2005 | Sarcanin | G06Q 40/00 705/67 |
| 2006/0261152 A1* | 11/2006 | Wong | 235/379 |

OTHER PUBLICATIONS

English Translation of International Preliminary Report on Patentability dated Jul. 10, 2014 issued in Patent Application No. PCT/JP2012/083677.
International Search Report for PCT/JP2012/083677 dated Jan. 29, 2013.

* cited by examiner

PORTABLE TERMINAL, TERMINAL FUNCTION MANAGEMENT SYSTEM, TERMINAL FUNCTION MANAGEMENT METHOD, TERMINAL FUNCTION MANAGEMENT PROGRAM, AND COMPUTER-READABLE RECORDING MEDIUM UPON WHICH SAID PROGRAM HAS BEEN RECORDED

CROSS REFERENCE TO RELATED APPLICATIONS

This application is a National Stage of International Application No. PCT/JP2012/083677 filed Dec. 26, 2012, claiming priority based on Japanese Patent Application No. 2011-289810 filed Dec. 28, 2011, the contents of all of which are incorporated herein by reference in their entirety.

TECHNICAL FIELD

The present invention relates to a portable terminal, a terminal function management system, a terminal function management method, a terminal function management program, and a computer-readable recording medium upon which said program has been recorded.

BACKGROUND ART

A service that guarantees the electronic money balance in the event of the loss or theft of equipment or device having an IC with electronic money functionality has been provided. Further, a mobile phone that automatically sets the electronic money card to an unavailable state when a certain available period elapses after the electronic money card is set to an available state is disclosed in Patent Literature 1 below.

CITATION LIST

Patent Literature

PTL 1: Japanese Unexamined Patent Application Publication No. 2002-197423

SUMMARY OF INVENTION

Technical Problem

If the technique disclosed in Patent Literature 1 is applied to a mobile phone having an electronic money card, for example, the electronic money card is likely to be in the unavailable state at the point of time when the loss or theft of the mobile phone is found. It is thereby possible to prevent electronic money fraud by another person after loss or theft.

However, because the whole electronic money card is locked in the technique of Patent Literature 1, it is unable to check the electronic money balance. Thus, the electronic money balance to be guaranteed cannot be determined unless all of the necessary log data is acquired from a payment terminal and aggregated. Note that, if the payment terminal does not have a real-time online connection function, a time lag occurs to acquire the log data. Further, it is difficult to distinguish between proper use and fraudulent use only by referring to the log data.

In view of the foregoing, an object of the present invention is to provide a portable terminal, a terminal function management system, a terminal function management method, a terminal function management program, and a computer-readable recording medium storing the program that can prevent electronic money fraud by another person after loss or theft and readily and accurately determine the electronic money balance to be guaranteed.

Solution to Problem

A portable terminal according to one aspect of the present invention is a portable terminal accessible to an IC module including a storage means configured to store balance data indicating a balance of electronic money, a balance response means configured to read the balance data and transmits it as a response, an amount change means configured to change an amount indicated by the balance data based on balance change information, and an access control means configured to impose access restrictions to the balance data based on given authentication information and, only when the authentication information is presented, permit access to the balance data, the portable terminal including an access restriction setting means configured to cause the access control means to impose access restrictions to the balance data using authentication information entered by a user as the given authentication information, a balance acquisition means configured to present the entered authentication information and acquire balance data transmitted as a response from the balance response means in the IC module after access to the balance data is restricted by the access control means and before the restrictions are released, and a balance storage means configured to store the acquired balance data into a data storage means.

In the portable terminal according to one aspect of the present invention, the access control means is first made to impose access restrictions to the balance data using authentication information entered by a user as the given authentication information. It is thereby possible to prevent electronic money fraud by another person after loss or theft. Further, the entered authentication information is presented to acquire balance data transmitted as a response from the balance response means in the IC module after access to the balance data is restricted by the access control means and before the restrictions are released, and the acquired balance data is stored into a data storage means. It is thereby possible to readily and accurately determine the electronic money balance.

In the portable terminal according to another aspect, the balance storage means may store the acquired balance data into the data storage means by transmitting the balance data to a management server accessible to the data storage means.

In this aspect, the balance data acquired by the balance storage means is transmitted to the management server accessible to the data storage means and stored in the data storage means. It is thereby possible to more reliably prevent electronic money fraud by another person after loss or theft.

In the portable terminal according to another aspect, the portable terminal may further include an access restriction release means configured to cause the access control means to release access restrictions to the balance data using authentication information entered by a user as the given authentication information.

In this aspect, it is possible to cause the access control means to release access restrictions to the balance data using authentication information entered by a user as the given authentication information.

In the portable terminal according to another aspect, the access restriction release means may cause the balance acquisition means to acquire balance data when releasing access restrictions and, only when a balance indicated by the acquired balance data and a balance indicated by the balance data stored in the data storage means are the same, cause access restrictions to the balance data to be released.

In this aspect, the balance acquisition means is made to acquire balance data when releasing access restrictions and, only when a balance indicated by the acquired balance data and a balance indicated by the balance data stored in the data storage means are the same, access restrictions to the balance data are released. It is thereby possible to more reliably prevent electronic money fraud by another person after loss or theft.

In the portable terminal according to another aspect, the access restriction release means may cause access restrictions to the balance data to be released only when release information is acquired from the management server.

In this aspect, access restrictions to the balance data are released only when release information is acquired from the management server. It is thereby possible to more reliably prevent electronic money fraud by another person after loss or theft.

A terminal function management system according to one aspect of the present invention is a terminal function management system composed of a portable terminal accessible to an IC module including a storage means configured to store balance data indicating a balance of electronic money, a balance response means configured to read the balance data and transmits it as a response, an amount change means configured to change an amount indicated by the balance data based on balance change information, and an access control means configured to impose access restrictions to the balance data based on given authentication information, and a management server connectable with the portable terminal, the portable terminal including an access restriction setting means configured to cause the access control means to impose access restrictions to the balance data using authentication information entered by a user as the given authentication information, a balance acquisition means configured to acquire balance data transmitted as a response from the balance response means in the IC module after a specified time before access to the balance data is restricted by the access control means and before the restrictions are released, a balance transmitting means configured to transmit the acquired balance data to the management server accessible to the data storage means, and an access restriction release means configured to cause the access control means to release access restrictions to the balance data using authentication information entered by a user as the given authentication information, and the management server including a balance storage means configured to store the balance data received from the portable terminal into a data storage means, and a restriction release permitting means configured to transmit release information in response to a request from the portable terminal, wherein the access restriction release means causes access restrictions to the balance data to be released using specified release information acquired from the management server.

In the terminal function management system according to one aspect of the present invention, the access control means is first made to impose access restrictions to the balance data using authentication information entered by a user as the given authentication information. It is thereby possible to prevent electronic money fraud by another person after loss or theft. Further, the entered authentication information is presented to acquire balance data transmitted as a response from the balance response means in the IC module after a specified time before access to the balance data is restricted by the access control means and before the restrictions are released, and the acquired balance data is stored into a data storage means. It is thereby possible to readily and accurately determine the electronic money balance.

In the terminal function management system according to another aspect, the access control means in the IC module may impose access restrictions to the balance data based on given authentication information and permits access to the balance data only when the authentication information is presented, the balance acquisition means in the portable terminal may present the entered authentication information and acquire balance data transmitted as a response from the balance response means in the IC module after access to the balance data is restricted by the access control means and before the restrictions are released, the access restriction release means may cause the balance acquisition means to acquire balance data when releasing access restrictions and transmits the acquired balance data to the management server, and the restriction release permitting means in the management server may transmit the release information to the portable terminal only when a balance indicated by the balance data received from the portable terminal and a balance indicated by the balance data stored in the data storage means are the same.

In this aspect, access to balance data is restricted based on given authentication information, and the balance acquisition means is made to acquire balance data when releasing access restrictions, and the acquired balance data is transmitted to the management server, and the management server transmits the release information to the portable terminal only when a balance indicated by the balance data received from the portable terminal and a balance indicated by the balance data stored in the data storage means are the same. It is thereby possible to more reliably guarantee the electronic money balance.

In the terminal function management system according to another aspect, the management server may further include a disable information storage means configured to store disable information for determining whether an electronic money function on the IC module is disabled or not, and the restriction release permitting means in the management server may refer to the disable information stored in the disable information storage means and, when the electronic money function on the IC module to which the portable terminal having requested the release information is accessible is determined to be disabled, refrain from transmitting the release information to the portable terminal.

In this aspect, when it is determined that the electronic money function is disabled, the management server refrains from transmitting the release information to the portable terminal. Thus, with the disable information indicating that the electronic money function of the lost or thieved portable terminal is disabled, it is possible to more reliably prevent electronic money fraud by another person.

In the terminal function management system according to another aspect, the access restriction setting means in the portable terminal may cause the access control means to impose access restrictions to the balance data using encryption information generated using the entered authentication information as the given authentication information, the balance transmitting means in the portable terminal may further transmit the generated encryption information to the management server, the balance storage means in the management server may further store the encryption information received from the portable terminal into the data storage means, and the restriction release permitting means in the management server may transmit the encryption information as the release information in response to a request from the portable terminal.

In this aspect, the access control means is made to impose access restrictions to the balance data using encryption information as the given authentication information, the management server transmits the encryption information as the release information in response to a request from the portable terminal. In this manner, because access restrictions are imposed and released using the encryption information, it is possible to more readily prevent electronic money fraud by another person after loss of theft.

A terminal function management method according to one aspect of the present invention is a terminal function management method performed by a portable terminal accessible to an IC module including a storage means configured to store balance data indicating a balance of electronic money, a balance response means configured to read the balance data and transmits it as a response, an amount change means configured to change an amount indicated by the balance data based on balance change information, and an access control means configured to impose access restrictions to the balance data based on given authentication information and, only when the authentication information is presented, permit access to the balance data, the method including an access restriction setting step where the portable terminal causes the access control means to impose access restrictions to the balance data using authentication information entered by a user as the given authentication information, a balance acquisition step where the portable terminal presents the entered authentication information and acquires balance data transmitted as a response from the balance response means in the IC module after access to the balance data is restricted by the access control means and before the restrictions are released, and a balance storage step where the portable terminal stores the acquired balance data into a data storage means.

In the terminal function management method according to one aspect of the present invention, the access control means is first made to impose access restrictions to the balance data using authentication information entered by a user as the given authentication information. It is thereby possible to prevent electronic money fraud by another person after loss or theft. Further, the entered authentication information is presented to acquire balance data transmitted as a response from the balance response means in the IC module after a specified time before access to the balance data is restricted by the access control means and before the restrictions are released, and the acquired balance data is stored into a data storage means. It is thereby possible to readily and accurately determine the electronic money balance.

A terminal function management method according to one aspect of the present invention is a terminal function management method performed in a terminal function management system composed of a portable terminal accessible to an IC module including a storage means configured to store balance data indicating a balance of electronic money, a balance response means configured to read the balance data and transmits it as a response, an amount change means configured to change an amount indicated by the balance data based on balance change information, and an access control means configured to impose access restrictions to the balance data based on given authentication information, and a management server connectable with the portable terminal, the method including an access restriction setting step where the portable terminal causes the access control means to impose access restrictions to the balance data using authentication information entered by a user as the given authentication information, a balance acquisition step where the portable terminal acquires balance data transmitted as a response from the balance response means in the IC module after a specified time before access to the balance data is restricted by the access control means and before the restrictions are released, a balance transmitting step where the portable terminal transmits the acquired balance data to the management server accessible to the data storage means, a balance storage step where the management server stores the balance data received from the portable terminal into a data storage means, a restriction release permitting step where the management server transmits release information in response to a request from the portable terminal, and an access restriction release step where the portable terminal causes the access control means to release access restrictions to the balance data using authentication information entered by a user as the given authentication information, wherein, in the access restriction release step, the portable terminal causes access restrictions to the balance data to be released using specified release information acquired from the management server.

In the terminal function management method according to one aspect of the present invention, the access control means is first made to impose access restrictions to the balance data using authentication information entered by a user as the given authentication information. It is thereby possible to prevent electronic money fraud by another person after loss or theft. Further, the entered authentication information is presented to acquire balance data transmitted as a response from the balance response means in the IC module after a specified time before access to the balance data is restricted by the access control means and before the restrictions are released, and the acquired balance data is stored into a data storage means. It is thereby possible to readily and accurately determine the electronic money balance.

A terminal function management program according to one aspect of the present invention is a terminal function management program causing a computer to function as a portable terminal accessible to an IC module including a storage means configured to store balance data indicating a balance of electronic money, a balance response means configured to read the balance data and transmits it as a response, an amount change means configured to change an amount indicated by the balance data based on balance change information, and an access control means configured to impose access restrictions to the balance data based on given authentication information and, only when the authentication information is presented, permit access to the balance data, the program causing the computer to implement a function of an access restriction setting means configured to cause the access control means to impose access restrictions to the balance data using authentication information entered by a user as the given authentication information, a function of a balance acquisition means configured to present the entered authentication information and acquire balance data transmitted as a response from the balance response means in the IC module after access to the balance data is restricted by the access control means and before the restrictions are released, and a function of a balance storage means configured to store the acquired balance data into a data storage means.

In the terminal function management program according to one aspect of the present invention, the access control means is first made to impose access restrictions to the balance data using authentication information entered by a user as the given authentication information. It is thereby possible to prevent electronic money fraud by another person after loss or theft. Further, the entered authentication information is presented to acquire balance data transmitted as a response from the balance response means in the IC module after a specified time before access to the balance data is restricted by the access control means and before the restrictions are released, and the acquired balance data is stored into a data storage means. It is thereby possible to readily and accurately determine the electronic money balance.

A computer-readable recording medium according to one aspect of the present invention stores a terminal function management program causing a portable terminal accessible to an IC module including a storage means configured to store balance data indicating a balance of electronic money, a balance response means configured to read the balance data and transmits it as a response, an amount change means configured to change an amount indicated by the balance data based on balance change information, and an access control means configured to impose access restrictions to the balance data based on given authentication information and, only when the authentication information is presented, permit access to the balance data, to operate, the program causing the portable terminal to function as an access restriction setting means configured to cause the access control means to impose access restrictions to the balance data using authentication information entered by a user as the given authentication information, a balance acquisition means configured to present the entered authentication information and acquire balance data transmitted as a response from the balance response means in the IC module after access to the balance data is restricted by the access control means and before the restrictions are released, and a balance storage means configured to store the acquired balance data into a data storage means.

In the computer-readable recording medium according to one aspect of the present invention, the access control means is first made to impose access restrictions to the balance data using authentication information entered by a user as the given authentication information. It is thereby possible to prevent electronic money fraud by another person after loss or theft. Further, the entered authentication information is presented to acquire balance data transmitted as a response from the balance response means in the IC module after a specified time before access to the balance data is restricted by the access control means and before the restrictions are released, and the acquired balance data is stored into a data storage means. It is thereby possible to readily and accurately determine the electronic money balance.

A terminal function management system according to one aspect of the present invention is a terminal function management system composed of a portable terminal and a shop terminal accessible to an IC card including a storage means configured to store balance data indicating a balance of electronic money, a balance response means configured to read the balance data and transmits it as a response, an amount change means configured to change an amount indicated by the balance data based on balance change information, and an access control means configured to impose access restrictions to the balance data based on given authentication information, and a management server connectable with the portable terminal and the shop terminal, the portable terminal including an access restriction setting means configured to cause the access control means to impose access restrictions to the balance data using authentication information entered by a user as the given authentication information, a balance acquisition means configured to acquire balance data transmitted as a response from the balance response means in the IC card after a specified time before access to the balance data is restricted by the access control means and before the restrictions are released, a balance transmitting means configured to transmit the entered authentication information and the acquired balance data to the management server accessible to the data storage means, the shop terminal including an access restriction release means configured to cause the access control means to release access restrictions to the balance data using authentication information entered by a user as the given authentication information, and the management server including a data storage means configured to store the authentication information and the balance data received from the portable terminal into a data storage means, and a restriction release permitting means configured to transmit release information to the shop terminal only when the authentication information from the shop terminal and the authentication information stored in the data storage means are the same, wherein the access restriction release means causes access restrictions to the balance data to be released using specified release information acquired from the management server.

In the terminal function management system according to one aspect of the present invention, the access control means is first made to impose access restrictions to the balance data using authentication information entered by a user as the given authentication information. It is thereby possible to prevent electronic money fraud by another person after loss or theft. Further, access restrictions to the balance data are released only when released information is acquired from the management server. It is thereby possible to more reliably prevent electronic money fraud by another person after loss of theft.

Advantageous Effects of Invention

According to the present invention, it is possible to provide a portable terminal, a terminal function management system, a terminal function management method, a terminal function management program, and a computer-readable recording medium storing the program that can prevent electronic money fraud by another person after loss or theft and readily and accurately determine the electronic money balance to be guaranteed.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

<1> Overview of Embodiment

Figure 1:
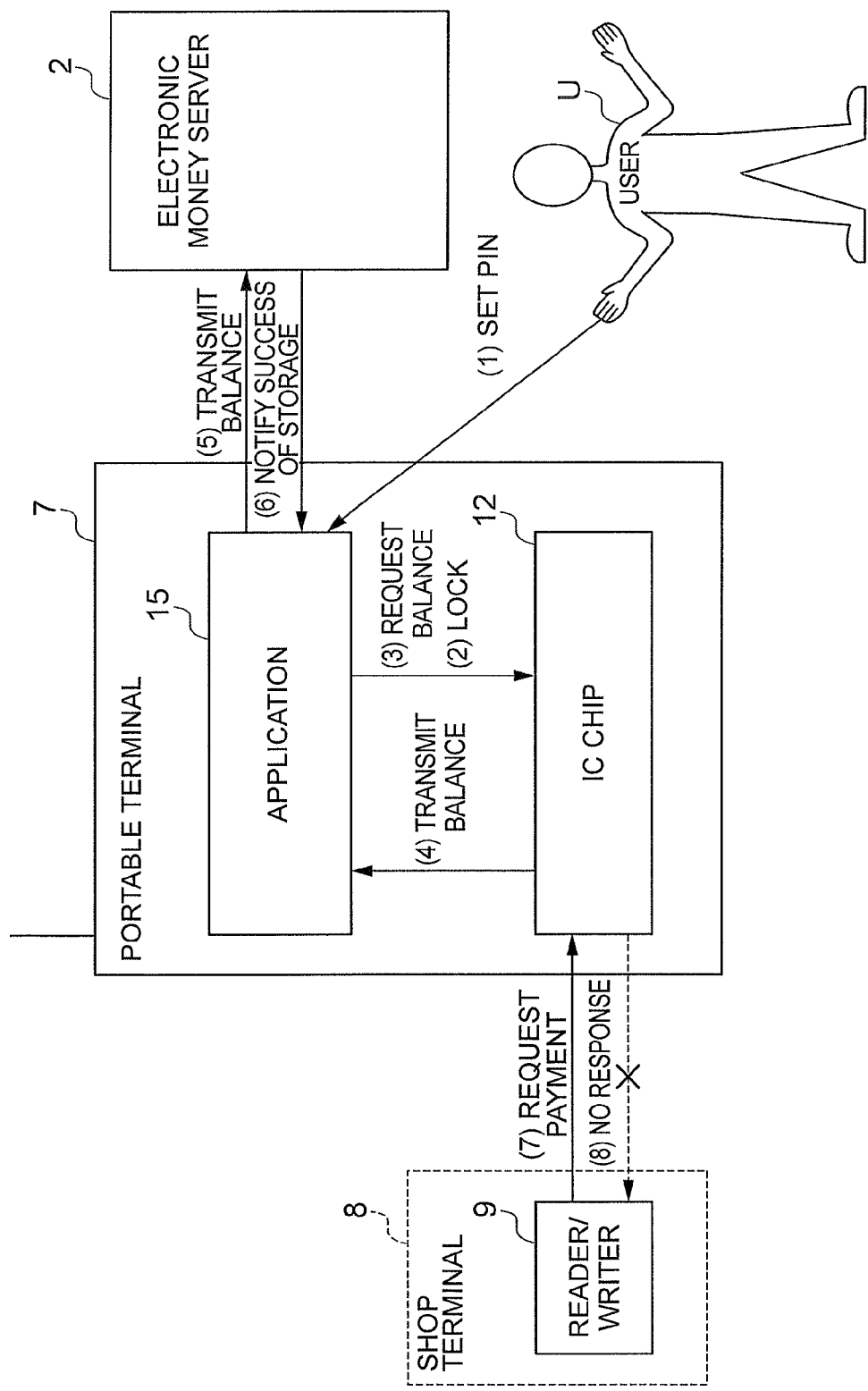
FIG. 1 is a diagram illustrating the overview of an embodiment of a portable terminal.

First, the overview of an embodiment of a portable terminal according to the present invention is described hereinafter with reference to FIG. 1. FIG. 1 is a diagram illustrating the overview of an embodiment of a portable terminal 7. The portable terminal 7 is a portable telephone terminal capable of Internet communications, such as a smartphone. The portable terminal 7 has electronic money functions such as payment processing with electronic money using a built-in contactless IC chip 12 and account increase and decrease processing. Further, the portable terminal 7 has an access control function (which is referred to hereinafter as "lock function") that imposes access restrictions on a specific area in the IC chip 12 and restricts access to data stored in the area. The IC chip 12 stores balance data indicating the balance of electronic money in a specified storage area.

Further, the portable terminal 7 can communicate with an electronic money server 2 (management server). Communication with the electronic money server 2 is performed using an application 15, which is application software to provide various services related to electronic money.

First, in the state the lock function of the IC chip 12 is disabled, a user U of the portable terminal 7 sets (enters) PIN (Personal Identification Number; authentication information) to enable the lock function to the portable terminal 7 using the application 15 (procedural step 1). The application 15 completes enabling the lock function of the IC chip 12 (procedural step 2).

Next, the application 15 temporarily unlocks and accesses the IC chip 12 and requests the current value balance (balance data) (procedural step 3). In response to the request from the application 15, the IC chip 12 transmits the value balance to the application 15 (procedural step 4). When the balance is acquired, the application 15 re-locks the IC chip 12. Then, the application 15 transmits the received value balance to the electronic money server 2 (procedural step 5), and the electronic money server 2 stores the received value balance into a specified storage device and notifies the application 15 that the value balance has been successfully stored (procedural step 6).

Because the lock function on the IC chip 12 has been enabled, the payment by the IC chip 12 is not allowed, and processing of reducing and updating the value balance is not possible. Therefore, even when a reader/writer 9 included in a shop terminal 8 (communication terminal) requests payment processing through near-field communication to the IC chip 12 (procedural step 7), for example, there is no response (or a message indicating an error is output) and payment processing is not carried out (procedural step 8).

Note that any one of the following lock functions can be used in this invention. In the following description, the case of using the lock function (a) is described as an example.

(a) To "hide" a specified area in the IC chip, set a hide flag to ON. In other words, "hide" an area for storing the electronic money balance or an area including that area. In this case, when an access command to the hidden area is received, the IC chip makes no response (or sends a code indicating "no area" back).

(b) Make an ON instruction for a negative flag stored in the IC chip and thereby set the negative flag of the IC chip to ON. A payment terminal such as the shop terminal 8 checks the negative flag in the IC chip 12 at the beginning of payment processing and, if it is ON, does not proceed to the subsequent processing and sends an error message back, to stop the electronic money function (make it unavailable).

(c) Impose access restrictions individually on a specified storage area (an electronic money balance area or an area including that area) in the IC chip. In this case also, set an access restriction flag to ON.

<2> Details of Embodiment

Figure 2:
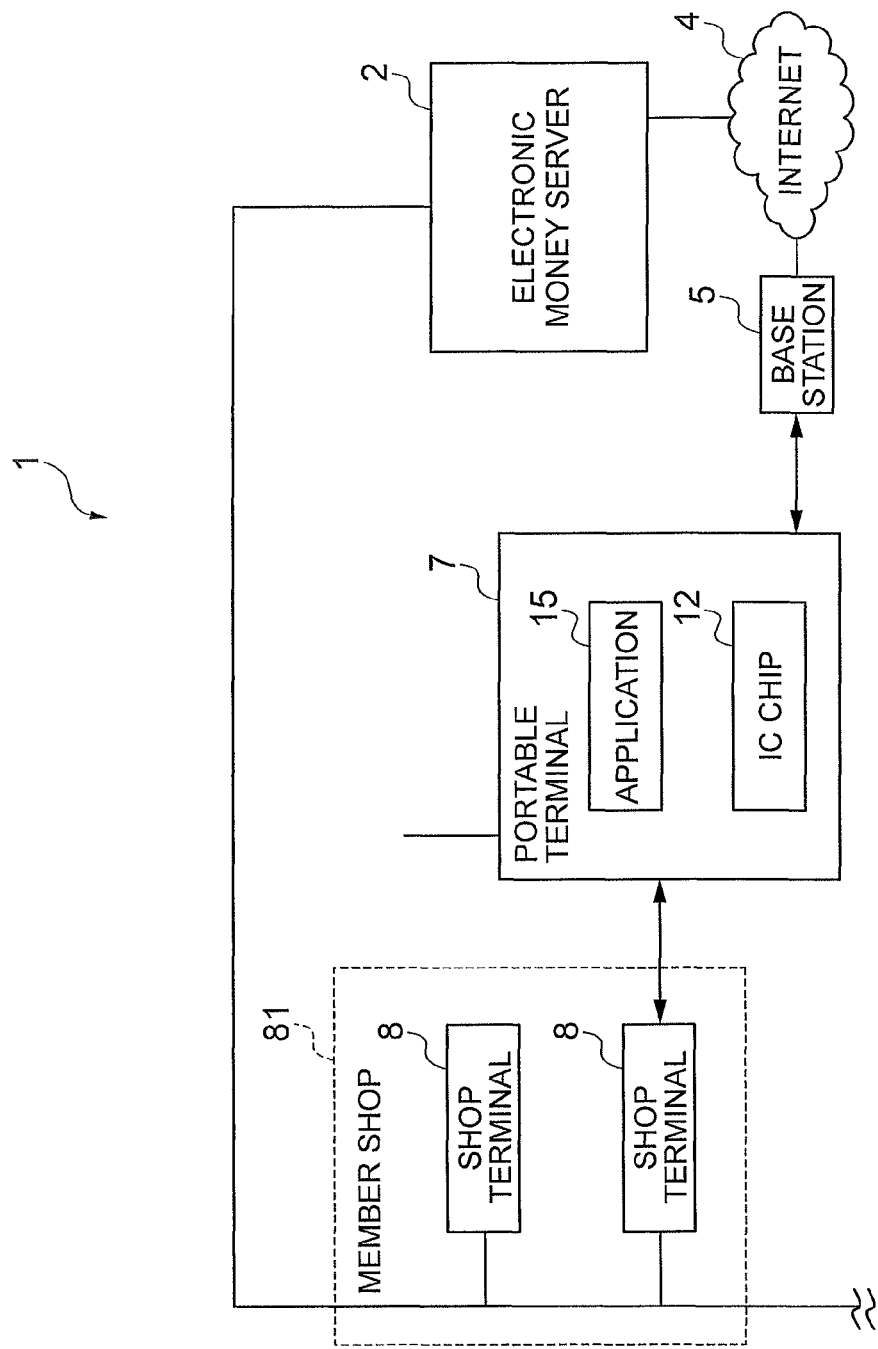
FIG. 2 is a diagram showing a network configuration of an electronic money system.

Details of an embodiment of the portable terminal 7 are described hereinafter with reference to FIG. 2. FIG. 2 is a diagram showing a network configuration of an electronic money system 1 (terminal function management system). The electronic money system 1 includes the portable terminal 7, the electronic money server 2, the Internet 4, a base station 5, and the shop terminal 8 located in a member shop 81.

The portable terminal 7 can communicate with the electronic money server 2 through the Internet 4 by wireless communication with the base station 5. Further, the portable terminal 7 includes the application 15 (access restriction setting means, balance acquisition means, and a balance storage means) and the IC chip 12.

The IC chip 12 has an antenna for near-field communication and can thereby perform near-field communication with the reader/writer of the shop terminal 8. The IC chip 12 can store the value balance and can make payment by executing a command transmitted from the shop terminal 8 in the condition where the lock function of the IC chip 12 is disabled.

The application 15 accepts input of PIN and sets the lock on the IC chip 12 (enable the lock function) and releases the lock on the IC chip 12 (disable the lock function). After the point of time that is a specified time (for example, several milliseconds to several seconds) before completing enabling the lock function of the IC chip 12, the application 15 acquires the value balance of the IC chip 12 and transmits it to the electronic money server 2 and then receives completion information indicating that the value balance has been successfully stored in the electronic money server 2.

The electronic money server 2 is a server that manages distribution of values in the electronic money system 1. The electronic money server 2 collects log data indicating payment records from the shop terminal 8 on a regular or irregular basis. Then, the electronic money server 2 aggregates the collected log data and log data at payment by the IC chip 12 together and makes correspondence with the distribution of values.

The member shop 81 is a business, such as a retail store or a restaurant, that provides items and services, getting paid from users. The member shop 81 is a member of a federation to use an electronic money service provided by the electronic money system 1 and includes one or a plurality of shop terminals 8.

The shop terminal 8 performs near-field communication with the IC chip 12 and, in the condition where the lock function of the IC chip 12 is disabled, transmits a command to the IC chip 12 and performs payment processing. The shop terminal 8 transmits log data describing the processing with the IC chip 12 to the electronic money server 2 on a regular or irregular basis.

Figure 3:
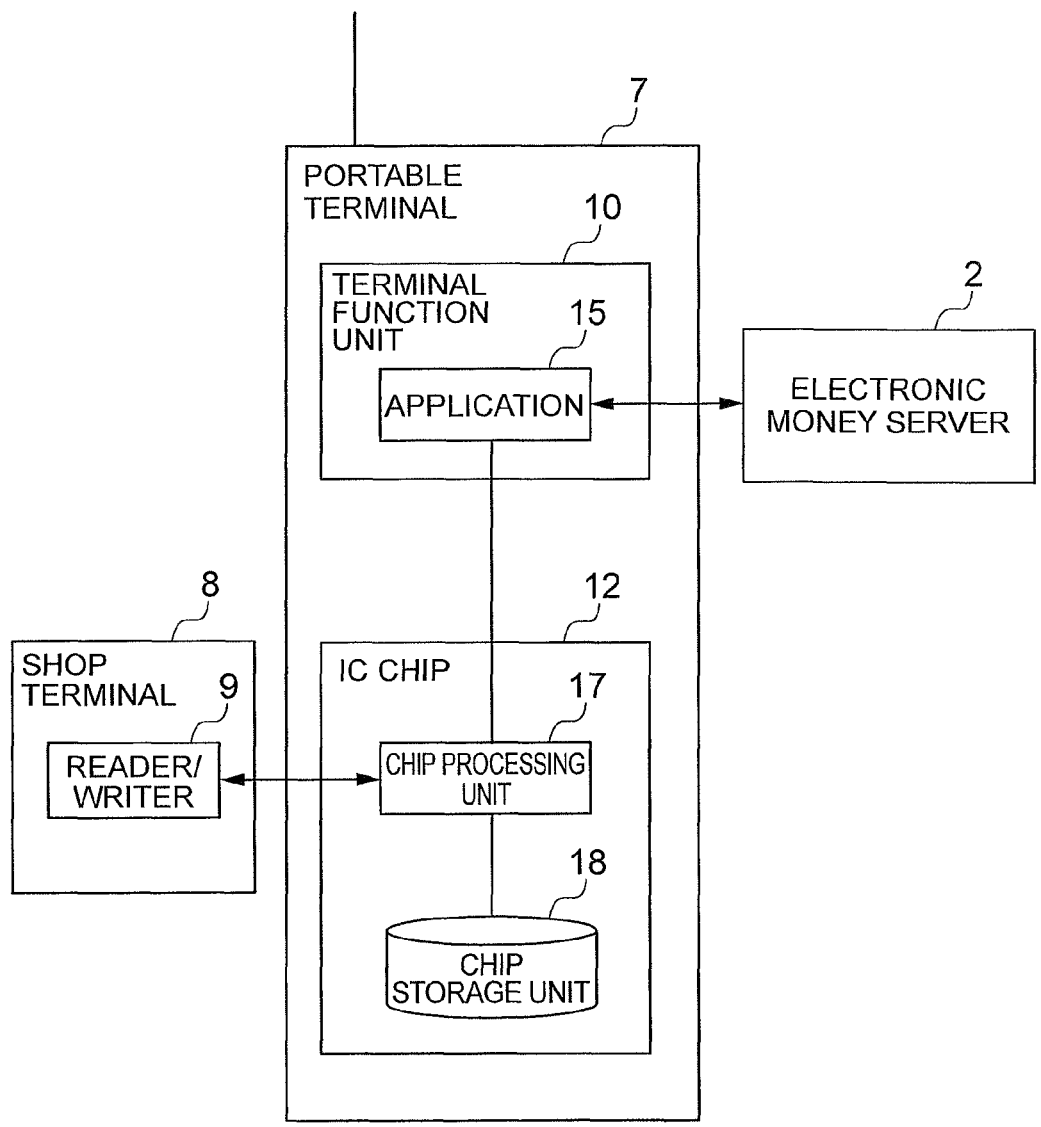
FIG. 3 is a diagram showing a functional configuration of a portable terminal.
Figure 4:
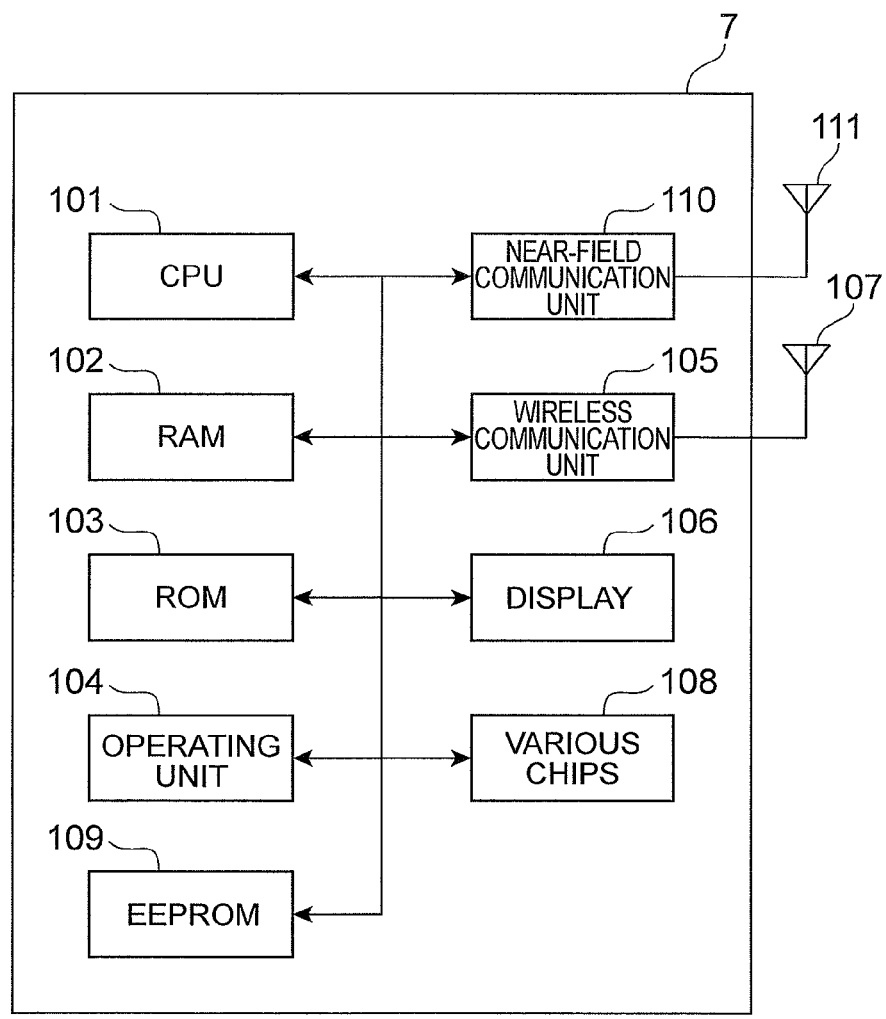
FIG. 4 is a diagram showing a physical configuration of a portable terminal.

The configuration of the portable terminal 7 is further described with reference to FIGS. 3 and 4. FIG. 3 is a diagram showing a functional configuration of the portable terminal 7, and FIG. 4 is a diagram showing a physical configuration of the portable terminal 7. As shown in FIG. 4, the portable terminal 7 is a small computer terminal that includes hardware such as a CPU 101 (Central Processing Unit), a RAM 102 (Random Access Memory), a ROM 103 (Read Only Memory), an EEPROM 109 (Electrically Erasable Programmable Read Only Memory), an operating unit 104, a wireless communication unit 105, a near-field communication unit 110, a display 106, antennas 107 and 111, and various types of chips 108 as principal physical components. The functions of the portable terminal 7 are exerted by the operation of those functional components.

Further, as shown in FIG. 3, the portable terminal 7 includes an application 15 (setting means), a terminal function unit 10 (connection means) having the application 15, and an IC chip 12 capable of communication with the terminal function unit 10 as principal functional components, and the IC chip 12 includes a chip processing unit 17 (authorization storage means) that connects with the antenna for near-field communication and a chip storage unit 18 (data storage means) that is controlled by the chip processing unit 17.

The IC chip 12 has the function as a computer including a CPU (Central Processing Unit), a RAM (Random Access Memory), a ROM (Read Only Memory), an EEPROM and the like. As described later, the terminal function unit 10 also has the function as a computer, and, in the portable terminal 7, two computers are capable of communications with each other.

The chip storage unit 18 has a plurality of storage areas where restrictions are imposed on connections and communications by the application 15 and stores electronic data such as a value balance and log data. The value balance is the amount of currently stored electronic money. The log data is log data records of processing performed for electronic money, such as payment and balance inquiry.

The terminal function unit 10 is a computer including a CPU, a ROM, a RAM, an EEPROM, a touch screen, a speaker, a microphone, a GPS (Global Positioning System) positioning module and the like. The terminal function unit 10 can acquire the value balance by connecting and communicating with (accessing) the chip storage unit 18 of the IC chip 12 and can also wirelessly communicate with the base station 5 (see FIG. 2). In the EEPROM, the application 15 is installed.

The application 15 stores PIN as authentication information that allows access to the storage area where restrictions on connections and communications are imposed. PIN is entered by a user U of the portable terminal 7 and stored into the EEPROM 109, for example. The terminal function unit 10 acquires PIN from the EEPROM 109, uses it to temporarily release the lock function of the IC chip 12, and thereby acquires the value balance stored in the chip storage unit 18. Note that the application 15 can enable the lock function that makes it impossible to acquire (inquire) the value balance, excluding the terminal function unit 10 that makes access using PIN.

Further, the application 15 can carry out unlocking or locking control on the IC chip 12 using encryption information such as random number data. When the application 15 performs locking control using encryption information such as random number data, it transmits the encryption information to the electronic money server 2 for storage. Then, when the encryption information is required for unlocking, the application 15 transmits instruction information that instructs transmission of the encryption information to the electronic money server 2 that stores the encryption information. The application 15 can thereby receive the encryption information.

Further, in the state where the lock function of the IC chip 12 is enabled, the application 15 temporarily releases the lock function using PIN acquired from the EEPROM 109 and accesses the chip storage unit 18 through the chip processing unit 17. Further, in the state where the chip storage unit 18 is accessible, the application 15 makes control to enable the functions of reading the value balance from the IC chip 12 by entering a balance inquiry command to the IC chip 12, and reading the log data by entering a log data inquiry command.

Further, in the state where the lock function of the IC chip 12 is disabled, the application 15 accesses the IC chip 12 through the terminal function unit 10 and makes settings to impose restrictions on access to the chip storage unit 18, and thereby enables the lock function of the IC chip 12. As a result, the function of performing payment processing using the value balance is disabled.

Further, the application 15 transmits the value balance that is read after the point of time that is a specified time (for example, several milliseconds to several seconds) before the lock function is enabled (that is, before the setting is done) to the electronic money server 2 located outside the portable terminal 7 for storage. Note that the read value balance may be stored in the portable terminal 7 (for example, in the terminal function unit 10). Further, the value balance that is transmitted from the application 15 to the electronic money server 2 and stored therein may be the value balance that is read during a period from the point of time when the lock function becomes enabled (which is, when the setting is done) to when access from the application 15 to the chip storage unit 18 ends.

Further, the application 15 may acquire the value balance stored in the electronic money server 2 after the point of time that is a specified time before the lock function is disabled (that is, before the setting is done) and may transmit the acquired value balance to the electronic money server 2. The processing of the value balance acquired in the electronic money server 2 is described later. Further, the application 15 may determine whether the value balance read while the lock function is enabled and the value balance stored in the electronic money server 2 are different or not, and if they are different, continue to enable the lock function. The acquisition of the value balance stored in the electronic money server 2 by the application 15 is described later.

The application 15 continues to enable the lock function until release information that instructs to release (disable) the lock function is received. Note that the application 15 can transmit request information that requests transmission of the release information to the electronic money server 2 based on input by a user of the portable terminal 7.

Further, the application 15 can accept input of PIN entered by a user of the portable terminal 7, and when it receives the entered PIN, performs control to switch the portable terminal 7 to the restriction mode where the lock function is enabled. Note that, if specified conditions are met after the lock function is released, the application 15 performs control to switch the portable terminal 7 back to the restriction mode. The specified conditions include when a GPS positioning module detects that the current position of the portable terminal 7 has entered a specified area, when a specified time period elapses after the lock function is released, when the portable terminal 7 is used a specified number of times after the lock function is released, when payment processing with a specified amount or more is performed by the IC chip 12 and the like.

Figure 5:
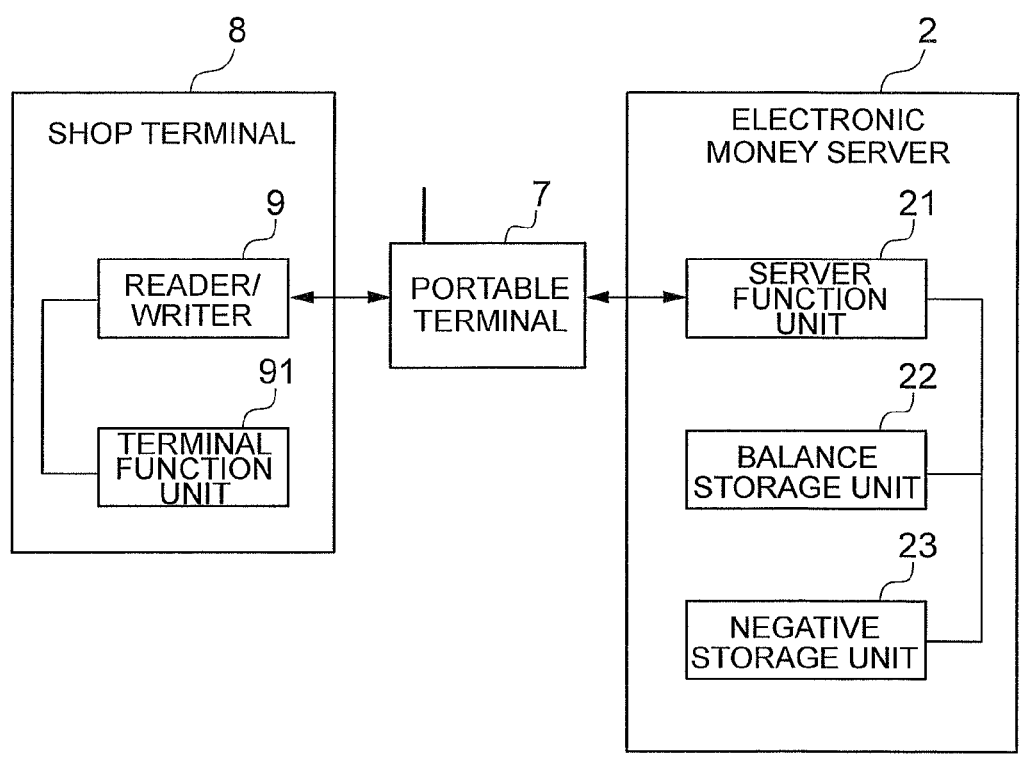
FIG. 5 is a diagram showing a functional configuration of an electronic money server and a shop terminal.

The configurations of the electronic money server 2 and the shop terminal 8 are described hereinafter with reference to FIGS. 5 and 6. FIG. 5 is a diagram showing functional configurations of the electronic money server 2 and the shop terminal 8, and FIG. 6 is a diagram showing physical configurations of the electronic money server 2 and the shop terminal 8.

Figure 6:
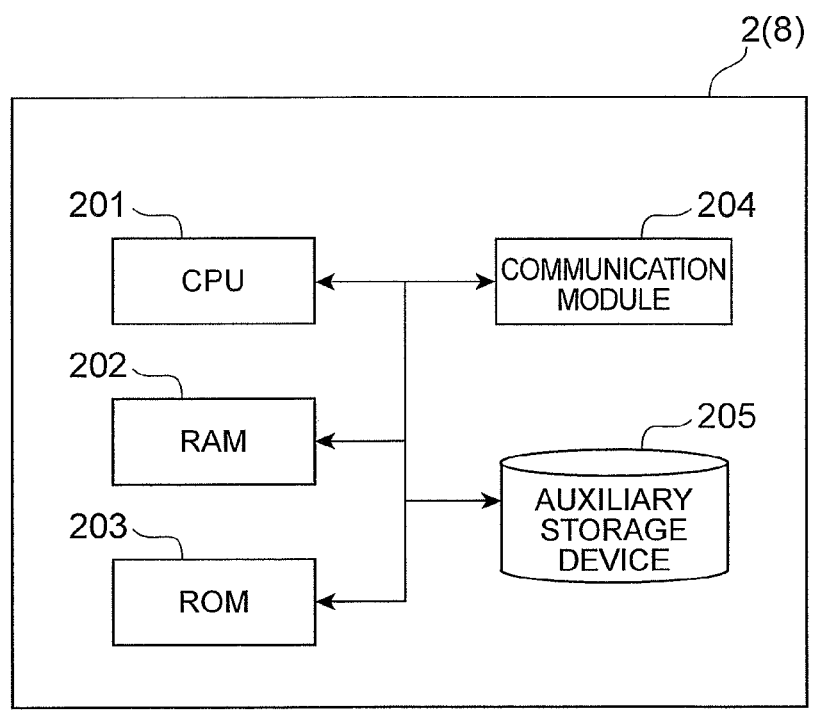
FIG. 6 is a diagram showing a physical configuration of an electronic money server and a shop terminal.

As shown in FIG. 6, each of the electronic money server 2 and the shop terminal 8 is configured as a computer that includes hardware such as a CPU 201 (Central Processing Unit), a RAM 202 (Random Access Memory) and a ROM 203 (Read Only Memory) as main storage devices, a communication module 204 for performing communications, and an auxiliary storage device 205 such as a hard disk as principal physical components. Those components operate so that the functions of the electronic money server 2 and the shop terminal 8 are exerted.

Further, as shown in FIG. 5, the electronic money server 2 includes a server function unit 21 (receiving means and transmitting means), a balance storage unit 22 (balance storage means), and a negative storage unit 23 (disable storage means) as principal functional components.

The server function unit 21 performs communications with the portable terminal 7. For example, the server function unit 21 can receive request information that requests transmission of release information both from the portable terminal 7 and the shop terminal 8. When the server function unit 21 receives the request information from the portable terminal 7 based on input by a user of the portable terminal 7, the server function unit 21 can transmit the release information to the portable terminal 7.

As another embodiment, the server function unit 21 may perform authentication that checks the request information received from the portable terminal 7 with the request information received from the shop terminal 8. When the authentication is successful, the server function unit 21 may transmit permission information that permits transmission of release information to the shop terminal 8. The reader/writer 9 in the shop terminal 8 that has received the permission information transmits the release information to the portable terminal 7, thereby enabling payment processing by the reader/writer 9.

Further, the server function unit 21 can receive the value balance from the portable terminal 7, and when the received value balance is stored in the balance storage unit 22, transmits success information notifying the success of storage and the value balance to the portable terminal 7.

Further, the server function unit 21 can determine whether the value balance received from the portable terminal 7 and the value balance stored in the balance storage unit 22 are the same or not and, when they are the same, transmit the release information to the portable terminal 7. In the case where it is described in negative information (disable information), which is described later, stored in the negative storage unit 23 that the chip storage unit 18 is disabled, the server function unit 21 stops transmission of the release information to the portable terminal 7 equipped with the negative storage unit 23.

When the server function unit 21 receives the value balance read after the point of time that is a specified time before the lock function is enabled (that is, before the setting is done), the balance storage unit 22 stores the value balance. After the value balance is stored in the balance storage unit 22, success information notifying the success of storage and the value balance is transmitted by the server function unit 21 to the portable terminal 7.

The negative storage unit 23 stores negative information indicating whether the chip storage unit 18 is disabled or not in advance. When the negative information indicates that the chip storage unit 18 is disabled, transmission of the release information to the portable terminal 7 equipped with the negative storage unit 23 by the server function unit 21 is stopped. Change to add the negative information is made when the portable terminal 7 is lost of thieved, for example, by a mobile communications carrier or the like that is informed of the loss or theft. On the other hand, change to delete the negative information is made when the portable terminal 7 is found, for example, by a mobile communications carrier or the like that is informed of the find.

Further, the shop terminal 8 includes a reader/writer 9 and a terminal function unit 91. The reader/writer 9 is a device that performs payment processing by performing near-field communication with the portable terminal 7 and reducing the value balance. The terminal function unit 91 can accept input of the request information by a user of the portable terminal 7. When the terminal function unit 91 receives the input request information, it transmits the input request information to the electronic money server 2. Further, the terminal function unit 91 can communicate with the electronic money server 2.

Figure 7:
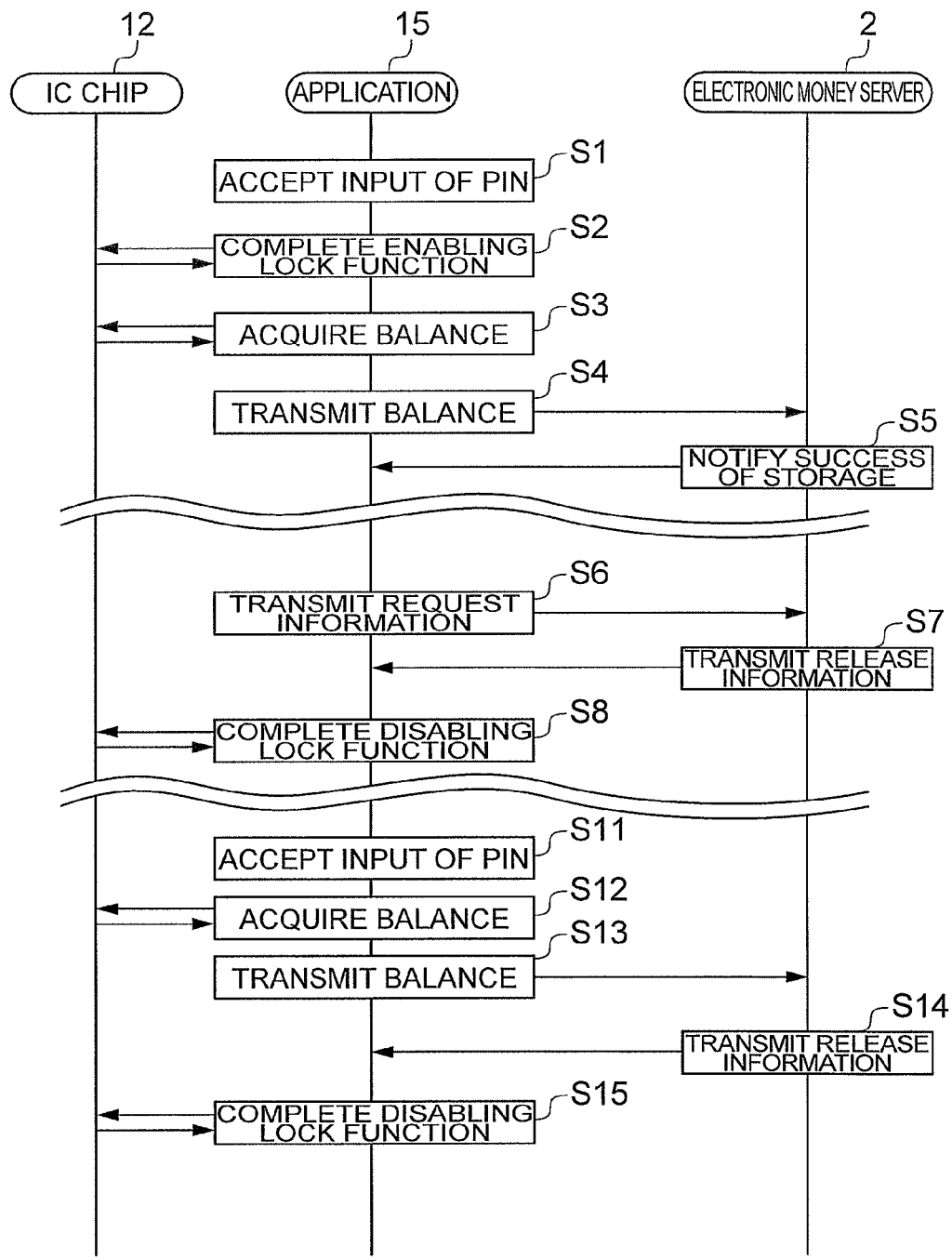
FIG. 7 is a flowchart illustrating a procedure of value balance storage processing involved with enabling a lock function.

<3> Procedure of Value Balance Storage Processing Involved with Enabling Lock Function A procedure of value balance storage processing (terminal function management method) involved with enabling the lock function which is performed in the portable terminal 7 is described hereinafter with reference to FIG. 7. FIG. 7 is a flowchart showing a procedure of value balance storage processing involved with enabling the lock function.

First, it is assumed that, in the state where the lock function of the IC chip 12 is disabled, a user U of the portable terminal 7 enters PIN to enable the lock function to the portable terminal 7 using the application 15. The application 15 accepts input of PIN (Step S1). Triggered by this event, the application 15 completes enabling the lock function of the IC chip 12 (Step S2, setting step).

Next, the application 15 temporarily unlocks and accesses to the IC chip 12 and acquires the current value balance (Step 3, connection step). Then, the application 15 transmits the acquired value balance to the electronic money server 2 (Step S4, control step), and the electronic money server 2 stores the received value balance into a storage area and notifies the success of storage and the value balance to the portable terminal 7 (Step S5).

Because the lock function of the IC chip 12 is already enabled, payment processing by the IC chip 12 is not allowed, and processing of reducing and updating the value balance is not possible. Accordingly, even if the reader/writer 9 in the shop terminal 8 (see FIG. 1) requests payment through near-field communication to the IC chip 12, for example, there is no response and payment is not made.

On the other hand, in the case where a user of the portable terminal 7 desires to make payment through near-field communication with the reader/writer 9, the user enters specified information (enters PIN, for example) to the application 15, and thereby request information is transmitted to the electronic money server 2 (Step S6, receiving step). The electronic money server 2 receives the request information from the portable terminal 7 and transmits release information to the portable terminal 7 (Step S7, transmitting step). When the portable terminal 7 receives the release information, the application 15 completes disabling the lock function (Step S8).

In another embodiment, it is assumed that, in the situation after Step S5, (which is the situation where the lock function of the IC chip 12 is enabled), a user U of the portable terminal 7 enters PIN to disable the lock function to the portable terminal 7 using the application 15. The application 15 accepts input of PIN (Step S11). Triggered by this event, the application 15 temporarily releases the lock function and accesses the IC chip 12 and then acquires the current value balance (Step S12) and transmits the acquired value balance to the electronic money server 2 (Step S13). When the balance is acquired, the application 15 locks the IC chip 12 again.

Then, the electronic money server 2 determines whether the value balance received from the portable terminal 7 in Step S13 and the value balance received from the portable terminal 7 in Step S4 and already stored in the balance storage unit 22 are the same or not and, when they are the same, transmits the above-described release information to the portable terminal 7 (Step S14). When the portable terminal 7 receives the release information, the application 15 completes disabling the lock function (Step S15).

<4> Module Configuration of Terminal Function Management Program

Figure 8:
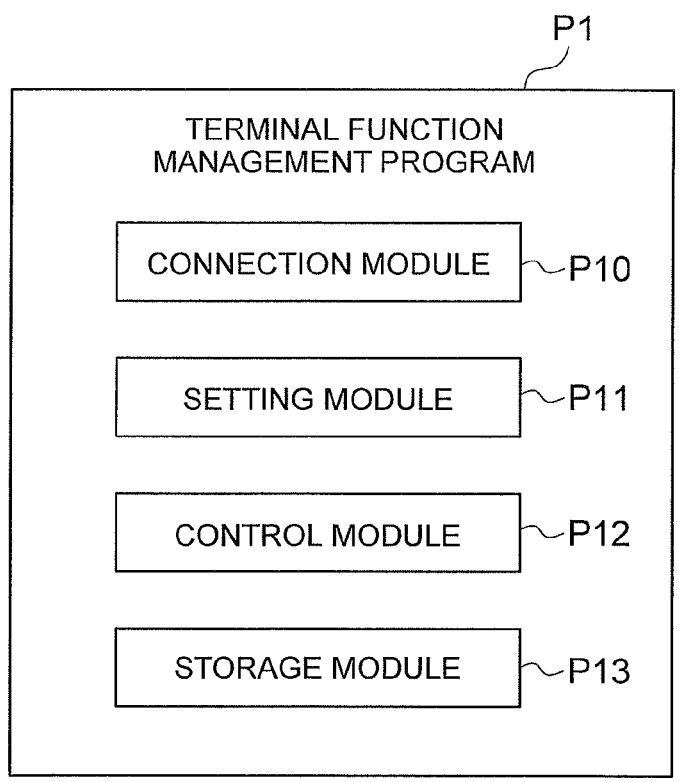
FIG. 8 is a module configuration diagram of a terminal function management program.

A module configuration of a terminal function management program that causes a computer to function as the portable terminal 7 is described hereinafter with reference to FIG. 8. FIG. 8 is a module configuration diagram illustrating a module configuration of a terminal function management program P1 that causes a computer to function as the portable terminal 7.

As shown in FIG. 8, the terminal function management program P1 includes a connection module P10, a setting module P11, a control module P12, and a storage module P13.

The connection module P10 is a part that exercises control over the function to execute operations of various information. By executing the connection module P10, the function of the terminal function unit 10 described above is implemented. The function implemented by executing the setting module P11 is the same as the function of the application 15 described above. The function implemented by executing the control module P12 is the same as the function of the chip processing unit 17 described above. The function implemented by executing the storage module P13 is the same as the function of the chip storage unit 18 described above.

The terminal function management program P1 is provided in the form of being recorded in a static manner on a recording medium such as CD-ROM, DVD-ROM or semiconductor memory, for example. Further, the terminal function management program P1 may be provided as a data signal superimposed onto a carrier wave through a communication network.

Figure 9:
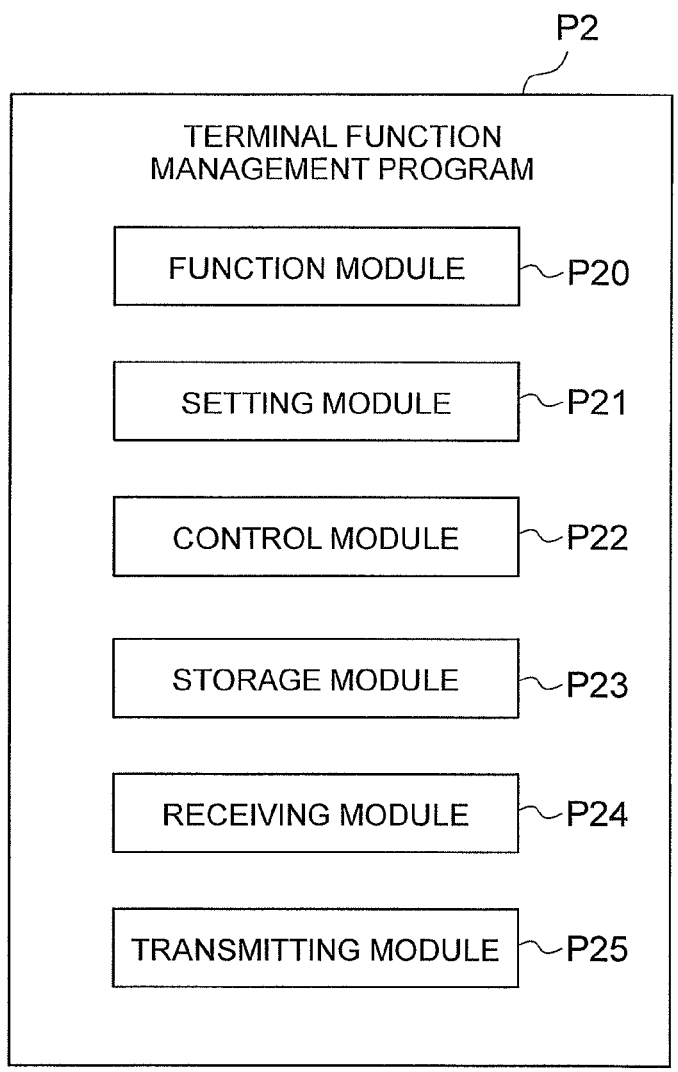
FIG. 9 is a module configuration diagram of a terminal function management program according to another embodiment.

<5> Module Configuration of Terminal Function Management Program in Another Embodiment A module configuration of a terminal function management program that causes the portable terminal 7 and the electronic money server 2 to operate is described hereinafter with reference to FIG. 9. FIG. 9 is a module configuration diagram illustrating a module configuration of a terminal function management program P2 that causes the portable terminal 7 and the electronic money server 2 to operate.

As shown in FIG. 9, the terminal function management program P2 includes a function module P20, a setting module P21, a control module P22, a storage module P23, a receiving module P24, and a transmitting module P25.

The function module P20 is a part that exercises control over the function to execute operations of various information. By executing the function module P20, the function of the terminal function unit 10 described above is implemented. The functions implemented by executing the setting module P21, the control module P22 and the storage module P23 are respectively the same as the functions of the application 15, the chip processing unit 17 and the chip storage unit 18 described above. The functions implemented by executing the receiving module P24 and the transmitting module P25 are the same as the functions of the electronic money server 2 described above.

The terminal function management program P2, just like the terminal function management program P1, is provided in the form of being recorded in a static manner on a recording medium or semiconductor memory. Further, the terminal function management program P2 may be provided through a communication network.

<6> Functions and Effects of the Present Invention

According to the portable terminal 7, setting processing (enabling the lock function) that imposes restrictions on access to the chip storage unit 18 that stores the value balance is executed. It is thereby possible to prevent electronic money fraud by another person after the loss or theft of the portable terminal 7. Further, the value balance that is acquired at or after the point of time that is a specified time before the enabling the lock function is completed is stored in the electronic money server 2. It is thereby possible to readily and accurately determine and guarantee the electronic money balance to be guaranteed in the balance guarantee service.

Further, the value balance that is acquired by the terminal function unit 10 during a period from the completion of enabling the lock function to the end of access described above may be stored in the electronic money server 2. It is thereby possible to more reliably prevent payment function fraud by another person after loss or theft.

Further, the electronic money server 2 that stores the acquired value balance is located outside the portable terminal 7. It is thereby possible to more reliably prevent payment function fraud by another person after loss or theft.

Further, the application 15 continues to enable the lock function when the value balance acquired by the terminal function unit 10 while the lock function is enabled and the value balance stored in the electronic money server 2 are different. It is thereby possible to more reliably prevent payment function fraud by another person after loss or theft.

Further, the application 15 continues to enable the lock function until it receives release information that instructs to release the lock function. It is thereby possible to more reliably prevent payment function fraud by another person after loss or theft.

Further, although the acquisition of the balance stored in the chip storage unit 18 becomes impossible, the acquisition of the value balance by the terminal function unit 10 that has acquired authentication information only is possible. Accordingly, it becomes impossible to acquire the value balance stored in the chip storage unit 18, and it is thereby possible to prevent payment function fraud by another person after loss or theft. Further, because it is possible to acquire the value balance only by the terminal function unit 10 that has acquired authentication information, by using the value balance acquired by the terminal function unit 10 for a service designed to a user not related to the above-described payment function, it is possible to enhance the convenience for a user of the portable terminal.

Further, the portable terminal 7 is switched to the restriction mode when authentication information is entered, and it is switched again to the restriction mode when specified conditions are met after the restriction mode is released. Therefore, even if a user of the portable terminal forgets about the switching after the release of the restriction mode, the portable terminal 7 is switched back to the restriction mode when specified conditions are satisfied. It is thereby possible to more reliably prevent payment function fraud by another person after loss or theft.

Further, according to the electronic money system 1, when the electronic money server 2 receives request information from the portable terminal 7, it transmits release information to the portable terminal 7 to release the lock function. The lock function can be thereby released in response to a request from a user of the portable terminal 7, and it is thereby possible to enhance the convenience for a user of the portable terminal 7.

Furthermore, when the value balance transmitted by the application 15 and the value balance stored in the electronic money server 2 are the same, release information is transmitted from the electronic money server 2 to the portable terminal 7. It is thereby possible to more reliably guarantee the electronic money balance.

Further, when negative information indicates that the chip storage unit 18 is disabled, the electronic money server 2 stops transmission of release information to the portable terminal 7 provided with the chip storage unit 18. Thus, with the negative information indicating that the chip storage unit 18 corresponding to the lost or thieved portable terminal is disabled, it is possible to more reliably prevent payment function fraud by another person.

Further, the portable terminal 7 enables the lock function using random number data and transmits the random number data to the electronic money server 2, and the electronic money server 2 receives instruction information that instructs the transmission of the random number data from the portable terminal 7 and then transmits release information to the portable terminal 7 to disable the lock function. In this manner, because the lock function is enabled and disabled using the random number data, it is possible to more reliably prevent payment function fraud by another person after loss or theft.

Further, the electronic money server 2 performs authentication that checks request information received from the portable terminal 7 with request information received from the shop terminal 8 and, when the authentication is successful, transmits permission information that permits the transmission of release information to the shop terminal 8. Then, the shop terminal 8 receives the permission information from the electronic money server 2 and transmits the release information to the portable terminal 7. Because authentication that checks the request information received from the portable terminal 7 with the request information received from the shop terminal 8 is performed and, when the authentication is successful, the lock function is released in response to a request from a user of the portable terminal 7, it is possible to enhance the convenience for a user of the portable terminal 7.

<7> Alternative Example

Figure 10:
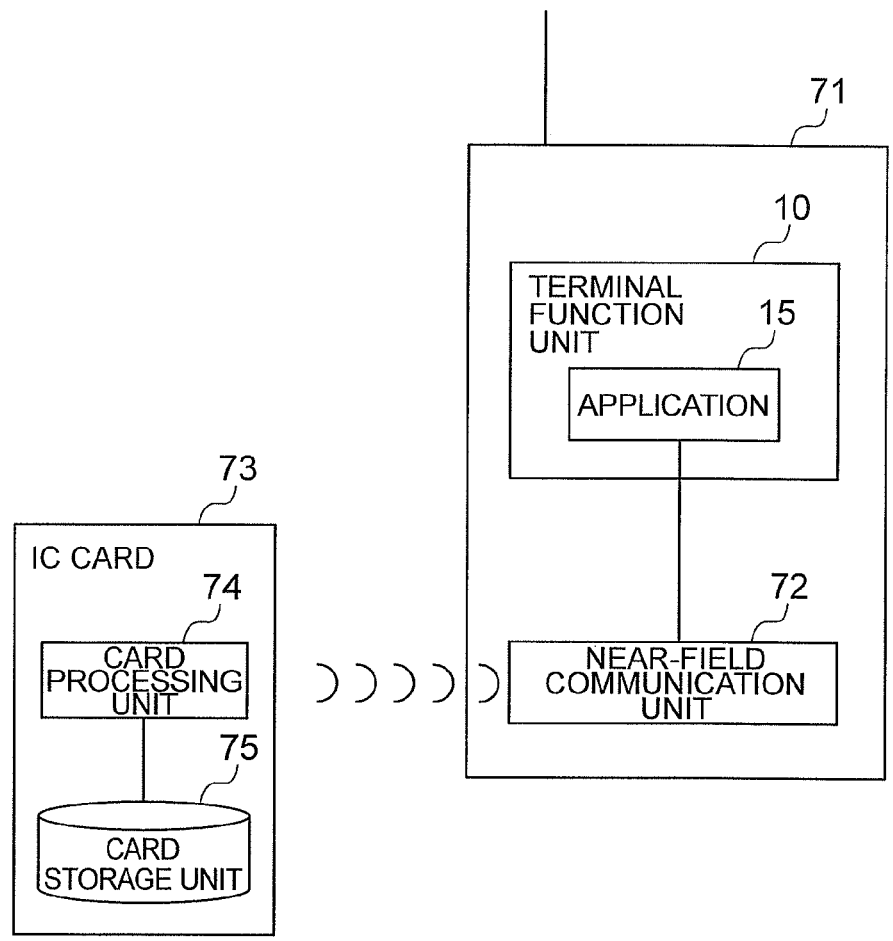
FIG. 10 is a diagram showing a functional configuration of a portable terminal according to another embodiment.

Although the case where the IC chip 12 is included in the portable terminal 7 is described in the embodiment according to the present invention, the location of the IC chip 12 is not particularly limited, and a flat plate IC card 73 having the same function as the IC chip 12 may exist separately from a portable terminal 71 as shown in FIG. 10, for example.

In this case, the IC card 73 includes a card processing unit 74 that has the same function as the chip processing unit 17 and a card storage unit 75 that has the same function as the chip storage unit 18. Then, a near-field communication unit 72 included in the portable terminal 71 performs near-field communication (NFC) with the IC card 73, so that the lock function of the IC card 73 can be enabled and disabled by the application 15 that accepts user input.

Further, in the embodiment according to the present invention, an example in which the lock function is enabled and disabled by entering PIN is described based on specific technological specifications. The present invention is not limited to this example, and can be implemented in any form in conformity with technological specifications of a payment system to be applied.

INDUSTRIAL APPLICABILITY

According to the embodiment, it is possible to prevent electronic money fraud by another person after loss or theft and readily and accurately determine the electronic money balance to be guaranteed.

REFERENCE SIGNS LIST

1 . . . electronic money system, 2 . . . electronic money server, 4 . . . Internet, 5 . . . base station, 7,71 . . . portable terminal, 8 . . . shop terminal, 9 . . . reader/writer, 10 . . . terminal function unit, 12 . . . IC chip, 15 . . . application, 17 . . . chip processing unit, 18 . . . chip storage unit, 21 . . . server function unit, 22 . . . balance storage unit, 23 . . . negative storage unit, 72 . . . near-field communication unit, 73 . . . IC card, 74 . . . card processing unit, 75 . . . card storage unit, 81 . . . member shop, 91 . . . terminal function unit, P1,P2 . . . terminal function management program, P10 . . . connection module, P11 . . . setting module, P12 . . . control module, P13 . . . storage module, P20 . . . function module, P20 . . . connection module, P21 . . . setting module, P22 . . . control module, P23 . . . storage module, P24 . . . receiving module, P25 . . . transmitting module, U . . . user

The invention claimed is:

1. A portable terminal accessible to an integrated circuit (IC) module including a storage configured to store balance data indicating a balance of electronic money, the IC module configured to read the balance data and transmit the balance data, and configured to change an amount indicated by the balance data based on balance change information, the portable terminal comprising a terminal function unit, the terminal function unit comprising:
at least one memory operable to store program code;
a non-volatile memory operable to store authentication information entered by a user; and
at least one processor operable to read the program code and operate as instructed by the program code,
the program code comprising:
access restriction setting code configured to cause the at least one processor to cause the IC module to receive a first entry of the authentication information by the user in a state in which a lock function of the IC module is not enabled, and impose access restrictions to the balance data by enabling a lock function of the IC module in response to the first entry of the authentication information by the user, wherein the authentication information of the first entry is stored in the non-volatile memory and when the lock function is enabled in response to the first entry of the authentication information and before the lock function is released in response to a second entry of the authentication information by the user, it is made impossible to acquire the balance data, excluding the terminal function unit that makes access to the IC module by using the authentication information of the first entry that has previously been stored in the non-volatile memory;

balance acquisition code configured to cause the at least one processor to, after the lock function of the IC module has been enabled in response to the first entry of the authentication information, (i) obtain the authentication information of the first entry previously stored in the non-volatile memory, (ii) temporarily unlock the IC module by using the authentication information obtained from the non-volatile memory, (iii) acquire balance data transmitted from the IC module, and (iv) perform a re-lock of the IC module to enable the lock function of the IC module, wherein operations (ii) and (iv) of temporarily unlocking of the IC module and the re-lock of the IC module are performed without requiring the second entry of the authentication information by the user; and balance storage code configured to cause the at least one processor to store the acquired balance data into a data storage.

2. The portable terminal according to claim 1, wherein the balance storage code causes the at least one processor to store the acquired balance data into the data storage by transmitting the balance data to a management server accessible to the data storage.

3. The portable terminal according to claim 1, wherein the program code further comprises:

access restriction release code configured to cause the at least one processor to cause the IC module to release the access restrictions to the balance data using a third entry of the authentication information by the user.

4. The portable terminal according to claim 3, wherein the access restriction release code causes the at least one processor to, only when a balance indicated by the acquired balance data and a balance indicated by the balance data stored in the data storage are the same, cause the access restrictions to the balance data to be released.

5. The portable terminal according to claim 3, wherein the access restriction release code causes the at least one processor to cause the access restrictions to the balance data to be released only when release information is acquired from a management server.

6. A terminal function management system comprising a portable terminal, accessible to an IC module including a storage configured to store balance data indicating a balance of electronic money, and a management server connectable with the portable terminal, the IC module configured to read and transmit the balance data, and configured to change an amount indicated by the balance data based on balance change information, the portable terminal comprising a terminal function unit, the terminal function unit comprising:

at least one first memory operable to store first program code;

a non-volatile memory operable to store authentication information entered by a user; and at least one first processor operable to read the first program code and operate as instructed by the first program code, the first program code comprising:

access restriction setting code configured to cause the at least one first processor to cause the IC module to receive a first entry of the authentication information by the user in a state in which a lock function of the IC module is not enabled, and impose access restrictions to the balance data by enabling a lock function of the IC module in response to the first entry of the authentication information by the user, wherein the authentication information of the first entry is stored in the non-volatile memory and when the lock function is enabled in response to the first entry of the authentication information and before the lock function is released in response to a second entry of the authentication information by the user, it is made impossible to acquire the balance data, excluding the terminal function unit that makes access to the IC module by using the authentication information of the first entry that has previously been stored in the non-volatile memory;

balance acquisition code configured to cause the at least one first processor to, at a time point that is a specified time before the lock function is enabled, acquire balance data transmitted from the IC module, and further configured to cause the at least one first processor to, after the lock function of the IC module has been enabled in response to the first entry of the authentication information, (i) obtain the authentication information of the first entry previously stored in the non-volatile memory, (ii) temporarily unlock the IC module by using the authentication information obtained from the non-volatile memory, (iii) acquire balance data transmitted from the IC module, and (iv) perform a re-lock of the IC module to enable the lock function of the IC module, wherein operations (ii) and (iv) of temporarily unlocking of the IC module and the re-lock of the IC module are performed without requiring the second entry of the authentication information by the user;

balance transmitting code configured to cause the at least one first processor to transmit the acquired balance data to the management server accessible to a data storage; and access restriction release code configured to cause the at least one first processor to cause the IC module to release the access restrictions to the balance data using the authentication information again entered by the user in a third entry of the authentication information, and the management server comprising:

at least one second memory operable to store second program code; and at least one second processor operable to read the second program code and operate as instructed by the second program code, the second program code comprising:

balance storage code configured to cause the at least one second processor to store the balance data received from the portable terminal into the data storage; and restriction release permitting code configured to cause the at least one second processor to transmit release information in response to a request from the portable terminal,
wherein the access restriction release code causes the at least one first processor to cause the IC module to release the access restrictions to the balance data using specified release information acquired from the management server.

7. The terminal function management system according to claim 6, wherein
the IC module imposes the access restrictions to the balance data based on the authentication information in the first entry of the authentication information and permits access to the balance data only when the authentication information in the first entry or the third entry of the authentication information is presented,
the access restriction release code causes the at least one first processor to acquire balance data when releasing the access restrictions and transmit the acquired balance data to the management server, and
the restriction release permitting code causes the at least one second processor to transmit the release information to the portable terminal only when a balance indicated by the balance data received from the portable terminal and a balance indicated by the balance data stored in the data storage are the same.

8. The terminal function management system according to claim 6, wherein
the management server further includes a disable information storage configured to store disable information for determining whether an electronic money function on the IC module is disabled, and
the restriction release permitting code causes the at least one second processor to refer to the disable information stored in the disable information storage and, when the electronic money function on the IC module to which the portable terminal having requested the release information is accessible is determined to be disabled, refrain from transmitting the release information to the portable terminal.

9. The terminal function management system according to claim 6, wherein
the access restriction setting code causes the at least one first processor to cause the IC module to impose the access restrictions to the balance data using encryption information generated using the entered authentication information in the first entry of the authentication information,
the balance transmitting code causes the at least one first processor to transmit the generated encryption information to the management server,
the balance storage code causes the at least one second processor to store the encryption information received from the portable terminal into the data storage, and
the restriction release permitting code causes the at least one second processor to transmit the encryption information as the release information in response to a request from the portable terminal.

10. A terminal function management method performed by a portable terminal accessible to an IC module including a storage configured to store balance data indicating a balance of electronic money, the IC module configured to read and transmit the balance data, and configured to change an amount indicated by the balance data based on balance change information, the portable terminal comprising a terminal function unit, the terminal function unit comprising a non-volatile memory operable to store authentication information entered by a user, the method comprising:
the portable terminal causing the IC module to receive a first entry of the authentication information by the user in a state in which a lock function of the IC module is not enabled, and impose access restrictions to the balance data by enabling a lock function of the IC module in response to the first entry of the authentication information by the user, wherein the authentication information of the first entry is stored in the non-volatile memory and when the lock function is enabled in response to the first entry of the authentication information and before the lock function is released in response to a second entry of the authentication information by the user, it is made impossible to acquire the balance data, excluding the terminal function unit that makes access to the IC module by using the authentication information of the first entry that has previously been stored in the non-volatile memory;
after the lock function of the IC module has been enabled in response to the first entry of the authentication information, the portable terminal (i) obtaining the authentication information of the first entry previously stored in the non-volatile memory, (ii) temporarily unlocking the IC module by using the authentication information obtained from the non-volatile memory, (iii) acquiring balance data transmitted from the IC module, and (iv) performing a re-lock of the IC module, wherein operations (ii) and (iv) of the temporarily unlocking of the IC module and the re-lock of the IC module are performed without requiring ft the second entry of the authentication information by the user; and
the portable terminal storing the acquired balance data into a data storage.

11. A terminal function management method performed in a terminal function management system comprising a portable terminal accessible to an IC module, including a storage configured to store balance data indicating a balance of electronic money, and a management server connectable with the portable terminal, the IC module configured to read and transmit the balance data, and configured to change an amount indicated by the balance data based on balance change information, the portable terminal comprising a terminal function unit, the terminal function unit comprising a non-volatile memory operable to store authentication information entered by a user, the method comprising:
the portable terminal causing the IC module to receive a first entry of the authentication information by the user in a state in which a lock function of the IC module is not enabled, and impose access restrictions to the balance data by enabling a lock function of the IC module in response to the first entry of the authentication information by the user, wherein the authentication information of the first entry is stored in the non-volatile memory and when the lock function is enabled in response to the first entry of the authentication information and before the lock function is released in response to a second entry of the authentication information by the user, it is made impossible to acquire the balance data, excluding the terminal function unit that makes access to the IC module by using the authentication information of the first entry that has previously been stored in the non-volatile memory;
the portable terminal acquiring balance data transmitted from the IC module at a time point that is a specified time before the lock function is enabled, and the portable terminal, after the lock function of the IC module has been enabled in response to the first entry of the authentication information, (i) obtaining the authentication information of the first entry previously stored in the non-volatile memory, (ii) temporarily unlocking the IC module by using the authentication information obtained from the non-volatile memory, (iii) acquiring balance data transmitted from the IC module, and (iv) performing a re-lock of the IC module to enable the lock function of the IC module, wherein operations (ii) and (iv) of the temporarily unlocking of the IC module and the re-lock of the IC module are performed without requiring the second entry of the authentication information by the user;

the portable terminal transmitting the acquired balance data to the management server accessible to a data storage;

the management server storing the balance data received from the portable terminal into the data storage;

the management server transmitting release information in response to a request from the portable terminal; and the portable terminal causing the IC module to release the access restrictions to the balance data using the authentication information again entered by the user in a third entry of the authentication information, wherein, the portable terminal causes the access restrictions to the balance data to be released using specified release information acquired from the management server.

12. A terminal function management system comprising a portable terminal and a shop terminal accessible to an IC card including a storage configured to store balance data indicating a balance of electronic money, and a management server connectable with the portable terminal and the shop terminal, the IC card configured to read and transmit the balance data, and configured to change an amount indicated by the balance data based on balance change information, the portable terminal comprising a terminal function unit, the terminal function unit comprising:

at least one first memory operable to store first program code;

a non-volatile memory operable to store authentication information entered by a user; and at least one first processor operable to read the first program code and operate as instructed by the first program code, the first program code comprising:

access restriction setting code configured to cause the at least one first processor to cause the IC card to receive a first entry of the authentication information by the user in a state in which a lock function of the IC module is not enabled, and impose access restrictions to the balance data by enabling a lock function of the IC module in response to the first entry of the authentication information by the user, wherein the authentication information of the first entry is stored in the non-volatile memory and when the lock function is enabled in response to the first entry of the authentication information and before the lock function is released in response to a second entry of the authentication information by the user, it is made impossible to acquire the balance data, excluding the terminal function unit that makes access to the IC module by using the authentication information of the first entry that has previously been stored in the non-volatile memory;

balance acquisition code configured to cause the at least one first processor to at a time point that is a specified time before the lock function is enabled, acquire balance data transmitted from the IC module, and further configured to cause the at least one first processor to, after the lock function of the IC module has been enabled in response to the first entry of the authentication information, (i) obtain the authentication information of the first entry previously stored in the non-volatile memory, (ii) temporarily unlock the IC module by using the authentication information obtained from the non-volatile memory, (iii) acquire balance data transmitted from the IC module, and (iv) perform a re-lock of the IC module to enable the lock function of the IC module, wherein operations (ii) and (iv) of temporarily unlocking of the IC module and the re-lock of the IC module are performed without requiring the second entry of the authentication information by the user;

balance transmitting code configured to cause the at least one first processor to transmit the authentication information entered in the first entry of the authentication information and the acquired balance data to the management server accessible to a first data storage, the shop terminal comprising:

at least one second memory operable to store second program code; and at least one second processor operable to read the second program code and operate as instructed by the second program code, the second program code comprising:

access restriction release code configured to cause the at least one second processor to cause the IC card to release the access restrictions to the balance data in response to a third entry of the authentication information entered by the user, and the management server comprising:

at least one third memory operable to store third program code; and at least one third processor operable to read the third program code and operate as instructed by the third program code, the third program code comprising:

data storage code configured to cause the at least one third processor to store the authentication information in the first entry of the authentication information and the balance data received from the portable terminal into a second data storage; and restriction release permitting code configured to cause the at least one third processor to transmit release information to the shop terminal only when the authentication information from the shop terminal in the third entry of the authentication information and the authentication information in the first entry of the authentication information and stored in the second data storage are the same, wherein the access restriction release code causes the at least one second processor to cause the access restrictions to the balance data to be released using specified release information acquired from the management server.

* * * * *